US012595582B2

(12) United States Patent \
Zhang et al.

(10) Patent No.: US 12,595,582 B2 \
(45) Date of Patent: Apr. 7, 2026

(54) ANODE PLATE FOR FILM PLATING MACHINE AND FILM PLATING MACHINE

(71) Applicant: Hithium Tech HK Limited, Kowloon (HK)

(72) Inventors: Xichong Zhang, Xiamen (CN); Yuyuan Wu, Xiamen (CN); Qian Zhao, Xiamen (CN); Qin Zhang, Xiamen (CN); Jinhua Lan, Xiamen (CN)

(73) Assignee: HITHIUM TECH HK LIMITED, Kowloon (HK)

( * ) Notice: Subject to any disclaimer, the term of this patent is extended or adjusted under 35 U.S.C. 154(b) by 915 days.

(21) Appl. No.: 17/853,047

(22) Filed: Jun. 29, 2022

(65) Prior Publication Data

US 2023/0002925 A1 Jan. 5, 2023

(30) Foreign Application Priority Data

Jun. 30, 2021 (CN) .......................... 202121477988.2

(51) Int. Cl.
| | |
|---|---|
| *C25D 17/12* | (2006.01) |
| *C25D 17/28* | (2006.01) |
| *H01M 4/04* | (2006.01) |
| *H01M 10/0525* | (2010.01) |

(52) U.S. Cl.
CPC ............. *C25D 17/12* (2013.01); *C25D 17/28* (2013.01); *H01M 4/0452* (2013.01); *H01M 10/0525* (2013.01)

(58) Field of Classification Search
CPC ..... C25D 17/12; C25D 17/28; H01M 4/0452; H01M 10/0525; H01M 10/058; H01M 4/0469; Y02E 60/10
See application file for complete search history.

(56) References Cited

U.S. PATENT DOCUMENTS

| | | | | |
|---|---|---|---|---|
| 4,311,577 A | * | 1/1982 | Kircher | ..................... C25B 9/73 204/255 |
| 4,828,654 A | * | 5/1989 | Reed | ....................... C25D 17/12 205/97 |
| 4,936,971 A | | 6/1990 | Pohto | |

(Continued)

FOREIGN PATENT DOCUMENTS

| | | | |
|---|---|---|---|
| CN | 105369337 A | * | 3/2016 |
| CN | 113265696 A | | 8/2021 |

(Continued)

OTHER PUBLICATIONS

Machine Translation of CN-105369337-A.*

(Continued)

*Primary Examiner* — Bryan D. Ripa \
(74) *Attorney, Agent, or Firm* — Scully, Scott, Murphy & Presser, P.C.

(57) ABSTRACT

An anode plate for a film plating machine and a film plating machine are provided. The anode plate is formed by splicing a plurality of anode plate splicing units, and two adjacent anode plate splicing units are separated by an insulating medium. Each anode plate splicing unit is connected with a power supply. The anode plate is applicable to film plating machines of different breadth.

11 Claims, 13 Drawing Sheets

(56)     References Cited

U.S. PATENT DOCUMENTS

| | | | | |
|---|---|---|---|---|
| 5,344,538 | A  * | 9/1994 | Chamberlain | C25D 17/12 |
| | | | | 204/290.13 |
| 8,128,790 | B2 * | 3/2012 | Tachi | C25D 17/12 |
| | | | | 204/206 |
| 2004/0232005 | A1 * | 11/2004 | Hubel | C25D 17/12 |
| | | | | 204/230.2 |
| 2009/0114530 | A1 * | 5/2009 | Noda | C25D 17/12 |
| | | | | 204/230.2 |
| 2009/0277796 | A1 * | 11/2009 | Francois | C25D 5/18 |
| | | | | 204/275.1 |
| 2012/0160705 | A1 * | 6/2012 | Robinson | C02F 1/463 |
| | | | | 205/756 |
| 2014/0231267 | A1 * | 8/2014 | Gomes De Abreu | C25B 11/02 |
| | | | | 204/290.01 |
| 2017/0298530 | A1 * | 10/2017 | Cheng | C25D 17/12 |
| 2020/0365873 | A1 * | 11/2020 | Oakes | H01M 4/0457 |

FOREIGN PATENT DOCUMENTS

| | | | | |
|---|---|---|---|---|
| CN | 215925133 | U | | 3/2022 |
| CN | 217922411 | U | | 11/2022 |
| DE | 102016003891 | A1 | * | 10/2017 |
| JP | H0718499 | A | * | 1/1995 |

OTHER PUBLICATIONS

Machine Translation of DE-102016003891-A1.*
Machine Translation of JP-H0718499A.*
Notice of Grant dated Jan. 13, 2022 received in Chinese Patent Application No. 202121477988.2.
First Office Action dated Jan. 2, 2025 received in Chinese Patent Application No. 202110739780.1.
Notice of Second Review dated Jun. 28, 2025 received in Chinese Patent Application No. 202110739780.1.

* cited by examiner

A–A

ANODE PLATE FOR FILM PLATING MACHINE AND FILM PLATING MACHINE

FIELD

The disclosure relates to the field of electroplating, and in particular, to an anode plate for a film plating machine and a film plating machine.

BACKGROUND

Lithium-ion batteries are rechargeable batteries whose main functional components are positive and negative electrodes and electrolytes. They are widely used because of their advantages of, for example, large capacity, small size and light weight. Lithium-ion batteries cause electrons to flow through an external circuit during a discharge process or a charge process, by means of an electrochemical reaction, so as to allow electrical energy to flow from or into the battery, respectively.

The current collector refers to a structure for collecting current, which mainly refers to a base metal of the positive electrode or negative electrode of the battery for attaching active materials in the lithium-ion batteries, such as copper foil and aluminum foil. Its function is mainly to collect the current generated by the active material of the battery to form a larger current for external output. The current collector is generally fabricated by forming a thick metal plating layer on a conductive substrate film in manner of electroplating, so as to ensure the conductive performance of the current collector. Specifically, a film plating machine can be configured to electroplate the conductive substrate film.

When electroplating the conductive substrate film with a film plating machine, an anode plate can be used as the anode, and the anode plate is generally an insoluble anode. The current anode plate is of an integral structure, and the length of the anode plate is adapted to a breadth specification of the film plating machine, so when the breadth specification of the film plating machine is larger, the length of the anode plate will be longer. However, in such case, the current at both ends of the anode plate is greater than the current in the middle thereof, since the anode plate is connected with the power supply through power access terminals at two ends of the anode plate, which results in a poor consistency of the plating layer on the surface of the conductive substrate film.

SUMMARY

The embodiments of the present disclosure disclose an anode plate for a film plating machine and a film plating machine. The anode plate can be applied to film plating machines with different breadths, and can improve the uniformity of the plating layer and meet the consistency requirements of the conductive substrate film.

In order to achieve the above purpose, in a first aspect, an embodiment of the present disclosure discloses an anode plate for a film plating machine. The anode plate is formed by splicing a plurality of anode plate splicing units, and two adjacent anode plate splicing units are separated by an insulating medium. Each anode plate splicing unit is configured to be connected with the power supply.

The anode plate for the film plating machine provided by the embodiment of the present disclosure can be formed by splicing a plurality of the anode plate splicing units according to the breadth of the film plating machine, so that the length of the anode plate can be flexibly adjusted. In addition, two adjacent anode plate splicing units are separated by an insulating medium, and each anode plate splicing unit is configured to be connected to the power supply, so that a parallel connection can be formed between the plurality of the anode plate splicing units, which causes the currents brought by the power supply into each anode plate splicing unit to be similar in magnitude, thereby ensuring the consistency of the plating layer on the surface of the conductive substrate film.

In an optional implementation of the first aspect, the plurality of anode plate splicing units are sequentially spliced along a first linear direction.

In actual use, a plurality of anode plate splicing units may be spliced along the breadth direction of the film plating machine. When the breadth is fixed, a small number of anode plate splicing units can be used to meet the breadth requirements.

In an optional implementation of the first aspect, the anode plate is a rectangular plate, and the first linear direction is a length direction of the rectangular plate.

The rectangular plate has a shape adapted to the shape of the conductive substrate film, and has a neat appearance which is easy to manufacture.

In an optional implementation of the first aspect, a splicing seam between two adjacent anode plate splicing units is inclined with respect to the first linear direction.

Therefore, in the electroplating process, a thinner plating layer produced by the splicing seam will not form a whole strip of thinner plating layer on the conductive substrate film, during the movement of the conductive substrate film along the film feeding direction, thereby eliminating the problem of uneven thickness of the plating layer, and improving the uniformity of the plating layer on the surface of the conductive substrate film.

In an optional implementation of the first aspect, the anode plate splicing unit is a trapezoidal plate, the plurality of trapezoidal plates have equal heights, and two adjacent trapezoidal plates are spliced together with one of non-parallel sides of one trapezoidal plate adjacent to one of non-parallel sides of the other trapezoidal plate.

The shape of the trapezoidal plate allows to manufacture trapezoidal plates with only two sizes, and an anode plate with a rectangular plate structure can be formed by splicing such two sizes of trapezoidal plates, so that the interchangeability of the anode plate splicing units is perfect, thereby improving the assembly efficiency, simplifying the manufacturing method and facilitating the implementation.

In an optional implementation of the first aspect, a middle part of the upper line and a middle part of the lower line of the trapezoidal plate are configured to be connected with the power supply respectively.

Therefore, the currents flowing through respective parts of the anode plate splicing unit can be basically consistent, so that the consistency of the plating layer on the surface of the conductive substrate film can be further improved.

In an optional implementation of the first aspect, the anode plate splicing units are rectangular plates, and a splicing seam between two adjacent anode plate splicing units extends along the width direction of the rectangular plate.

Therefore, all anode plate splicing units are rectangular plates, which are easy to manufacture.

In an optional implementation of the first aspect, a maximum length value of each anode plate splicing unit in the first linear direction is in a range of 300 mm to 350 mm The anode plate splicing unit selected in this value range not only can effectively reduce the resistance of the anode plate splicing unit, improve the uniformity of the current density, thereby improving the consistency of the plating layer on the surface of the conductive substrate film, but also can reduce the quality of the anode plate splicing unit, which causes the anode plate splicing unit to be easy to take and manufacture.

In an optional implementation of the first aspect, the anode plate splicing unit is provided with a through hole.

Therefore, the anode plate splicing unit not only has light weight and easy to take, but also can reduce the resistance of the anode plate splicing unit, increase the contacting area between the anode plate splicing unit and the plating solution, and effectively improve the uniformity of the plating layer on the surface of the conductive substrate film.

In an optional implementation of the first aspect, the anode plate for the film plating machine further includes a supporting frame. The supporting frame includes a border and a plurality of separating ribs arranged within the border, the border and the separating ribs are both made of insulating materials. A space enclosed by the border is divided into a plurality of subspaces by the plurality of the separating ribs, and in each subspace, an anode plate splicing unit which has a shape matching the shape of the subspace is fixed therein.

The above-mentioned supporting frame makes the splicing structure of the anode plate splicing unit more stable, and improves the reliability of the film plating machine.

In an optional implementation of the first aspect, each of the anode plate splicing units is connected with a conductive metal strip. The conductive metal strip extends along a direction perpendicular to the anode plate, and the conductive metal strip is configured to be connected with a power supply.

The conductive metal strip not only facilitates the connection with the power supply, but also facilitates the removal of the anode plate splicing unit from the plating solution.

In an optional implementation of the first aspect, a conductive metal frame is attached to the surface of each anode plate splicing unit, and the conductive metal frame is electrically connected to the conductive metal strip.

Therefore, the resistance of the anode plate splicing unit can be reduced, the currents through respective parts of the anode plate splicing unit are basically consistent, the uniformity of the current density is improved, and the consistency requirement of the plating layer on surface of the conductive substrate film can be more easily fulfilled.

In an optional implementation of the first aspect, the conductive metal frame is a cross-shaped metal frame, and the cross-shaped metal frame includes a first metal strip and a second metal strip that are cross-fixed. The first metal strip and the second metal strip are both attached to the surface of the anode plate splicing unit.

The above-mentioned structure of the cross-shaped metal frame makes the area of the metal frame attached to the anode plate splicing unit larger, which further improves the uniformity of the current density, thereby further improving the consistency of the plating layer on surface of the conductive substrate film.

In the second aspect, an embodiment of the present disclosure further discloses a film plating machine, which includes at least one power supply, a plating solution tank and a conductive substrate film conveying device disposed on both sides of the plating solution tank. The conductive substrate film conveying device is configured to drive the horizontally arranged conductive substrate film to move along a film feeding direction. The plating solution tank is sequentially provided therein with a plurality of anode plate groups at intervals along the film feeding direction, an anode plate group comprises an upper anode plate and a lower anode plate located on upper and lower sides of the conductive substrate film respectively, the upper anode plate and the lower anode plate each are the anode plate according to the first aspect. Each anode plate splicing unit in the anode plate is connected to the power supply In the film plating machine provided by the embodiment of the present disclosure, the conductive substrate film conveying device is configured to drive the horizontally arranged conductive substrate film to move along the film feeding direction, so as to bring the conductive substrate film enter and leave the plating solution tank. Within the plating solution tank, a plurality of upper anode plates and lower anode plates are provided at intervals on upper and lower sides of the conductive substrate film, respectively. The upper anode plate is configured for plating the upper surface of the conductive substrate film, the lower anode plate is configured for plating the lower surface of the conductive substrate film, and both the upper anode plate and the lower anode plate adopt the spliced anode plate, so that the plating layers on both the upper and lower surfaces of the conductive substrate film can be uniform.

In an optional implementation of the second aspect, the film plating machine includes a plurality of power supplies, and the plurality of anode plate splicing units are connected to the plurality of power supplies in one-to-one correspondence.

Therefore, not only the currents applied on each anode plate splicing unit can be ensured to be similar in magnitude, but also the currents applied on the corresponding anode plate splicing units can be adjusted respectively according to the uniformity of the plating layer on the surface of the conductive substrate film, so as to further ensure the consistency of the plating layer on the surface of the conductive substrate film.

In an optional implementation of the second aspect, the upper anode plate and the lower anode plate are both rectangular plates, and the upper anode plate and the lower anode plate are respectively formed by splicing a plurality of anode plate splicing units along a length direction of the rectangular plate. The width direction of the rectangular plate is parallel to the film feeding direction, the splicing seam between the adjacent two anode plate splicing units extends along the film feeding direction, and the splicing seams in the upper anode plates in adjacent two anode plate groups are staggered in the film feeding direction, and the splicing seams in the lower anode plates in adjacent two anode plate groups are staggered in the film feeding direction.

Therefore, by means of providing the splicing seams in the upper anode plate and the lower anode plate in the adjacent two anode plate groups in a staggered manner, it can effectively avoid the situation that part of the plating layer on the surface of the conductive substrate film is thin due to the splicing seams, which ensures that the plating layers on the upper surface and lower surface of the conductive substrate film are uniform, so that the conductive substrate film meets the requirement of consistency.

BRIEF DESCRIPTION OF DRAWINGS

In order to illustrate the technical solutions in the embodiments of the present disclosure more clearly, the accompanying drawings used in the embodiments will be briefly described below. Obviously, the drawings described below are only illustrated for some embodiments of the present disclosure. For those skilled in the art, other drawings would be obtained based on these drawings without any creative efforts.

LIST OF REFERENCE SIGNS

Figure 1:
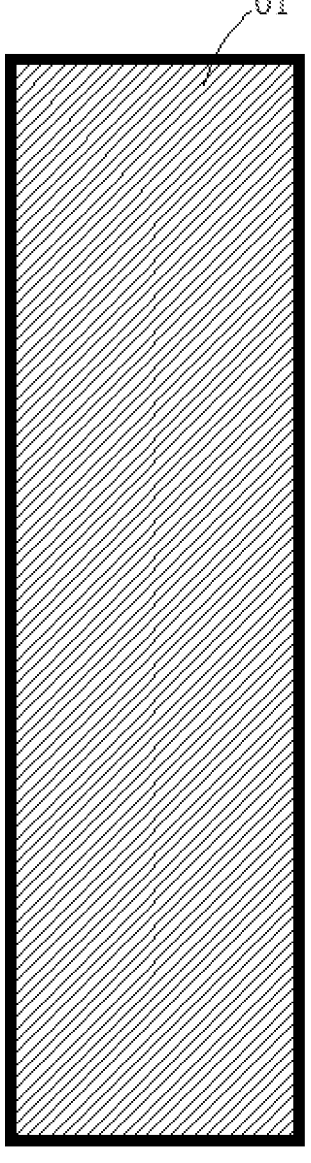
FIG. 1 is a structural schematic diagram of an integral anode plate.

01—integral anode plate; 1—anode plate; 11—anode plate splicing unit; 111—terminal; 112—through hole; 12—insulating medium; 13—conductive metal strip; 14—conductive metal frame; 141—first metal strip; 142—second metal strip; 15—supporting frame; 151—border; 152—separating rib; 2—power supply; 3—plating solution tank; 4—conductive substrate film conveying device; 5—conductive substrate film; 6—anode plate group.

DETAILED DESCRIPTION OF EMBODIMENTS

The technical solutions in the embodiments of the present disclosure will be clearly and completely described below with reference to the accompanying drawings in the embodiments of the present disclosure. Obviously, the described embodiments are only a part of the embodiments of the present disclosure, rather than all the embodiments. Based on the embodiments of the present disclosure, all other embodiments obtained by those skilled in the art without creative work will fall within the protection scope of the present disclosure.

In the present disclosure, the terms "upper", "lower", "left", "right", "front", "rear", "top", "bottom", "inner", "outer", "vertical", "horizontal", "lateral", "longitudinal", etc. indicate an orientation or positional relationship based on the orientation or positional relationship shown in the drawings. These terms are primarily used to better describe the present disclosure and the embodiments thereof, and are not intended to limit the fact that the indicated device, element or component must have a particular orientation, or be constructed and operated in a particular orientation.

In addition, some of the above terms may be used to express other meanings besides orientation or positional relationship, for example, the term "on" may also be used to express a certain attachment or connection relationship in some cases. Those skilled in the art would understand the specific meanings of these terms in the present disclosure according to specific situations.

Furthermore, the terms "install", "arrange", "provide", "connect", "join" should be construed broadly. For example, it may be a fixed connection, a detachable connection or an integral structure; it may be a mechanical connection or an electrical connection; it may be directly connected, or indirectly connected through an intermediary, or internal communication between two devices, elements, or components. Those skilled in the art would understand the specific meanings of the above terms in the present disclosure according to specific situations.

In addition, the terms "first", "second", etc. are mainly used to distinguish different devices, elements or components (the specific types and structures may be the same or different), and are not intended to indicate or imply the relative importance and number of the indicated devices, elements or components. Unless stated otherwise, the expression "plurality" means two or more.

Electroplating is a process in which some plated products are plated with a layer of other metals or alloys on the surface thereof by means of an electrolysis principle. Specifically, a plating metal or other insoluble material is used as the anode, the workpiece to be plated is used as the cathode, and the liquid containing the plating metal ions is used as the plating solution. During the electroplating process, the anode and cathode are energized, and the current forms a loop among the anode, the plating solution and the cathode. During the electroplating process, the cations of the plating metal are reduced on the surface of the workpiece to be plated to form a plating layer.

In the electroplating industry, the anode is generally made into a plate, so it is referred to as an anode plate. The anode plate can be a soluble anode plate or an insoluble anode plate. The soluble anode plate is an anode plate made of plating metal, such as an anode plate made of zinc and copper and similar materials, which can provide plating metal ions to the solution; and the insoluble anode plate is an anode plate that cannot be electrolyzed, such as an anode plate made of titanium and similar materials, in which case a manner of additionally adding salt will be adopted to supplement the metal ions in the plating solution.

FIG. 1 is a structural schematic diagram of an anode plate, which is an integral anode plate 01.

The integral anode plate 01 has a length adapted to the breadth specification of a film plating machine. When the breadth specification of the film plating machine is smaller, the length of the anode plate is smaller accordingly, and thus the currents flowing through parts of the anode plate are similar to each other, which can ensure consistency of a plating layer on the surface of the conductive substrate film; when the breadth specification of the film plating machine is larger, the length of the anode plate will be longer, which will causes that the currents at both ends of the anode plate will be larger, and the current in the middle part of the anode plate will be too small, since the current is usually introduced from two ends of the anode plate. As the magnitude of the current will directly affect thickness of the conductive substrate film, that is, the thickness of the plating layer on an area of the conductive substrate film corresponding to an area with higher current of the anode plate will be larger, and the thickness of the plating layer on an area of the conductive substrate film corresponding to an area with lower current of the anode plate will be smaller. As a result, the consistency of the plating layer on the surface of the conductive substrate film is poor.

In view of the above, embodiments of the present disclosure provide an anode plate for a film plating machine and a film plating machine. The anode plate provided by embodiments of the present disclosure can be applied to film plating machines with different breadth specifications, but also can improve the uniformity of the plating layer and meet the consistency requirements of the plating layer on surface of the conductive substrate film.

The anode plate for the film plating machine and the film plating machine are described in detail below by means of exemplary embodiments.

Figure 2:
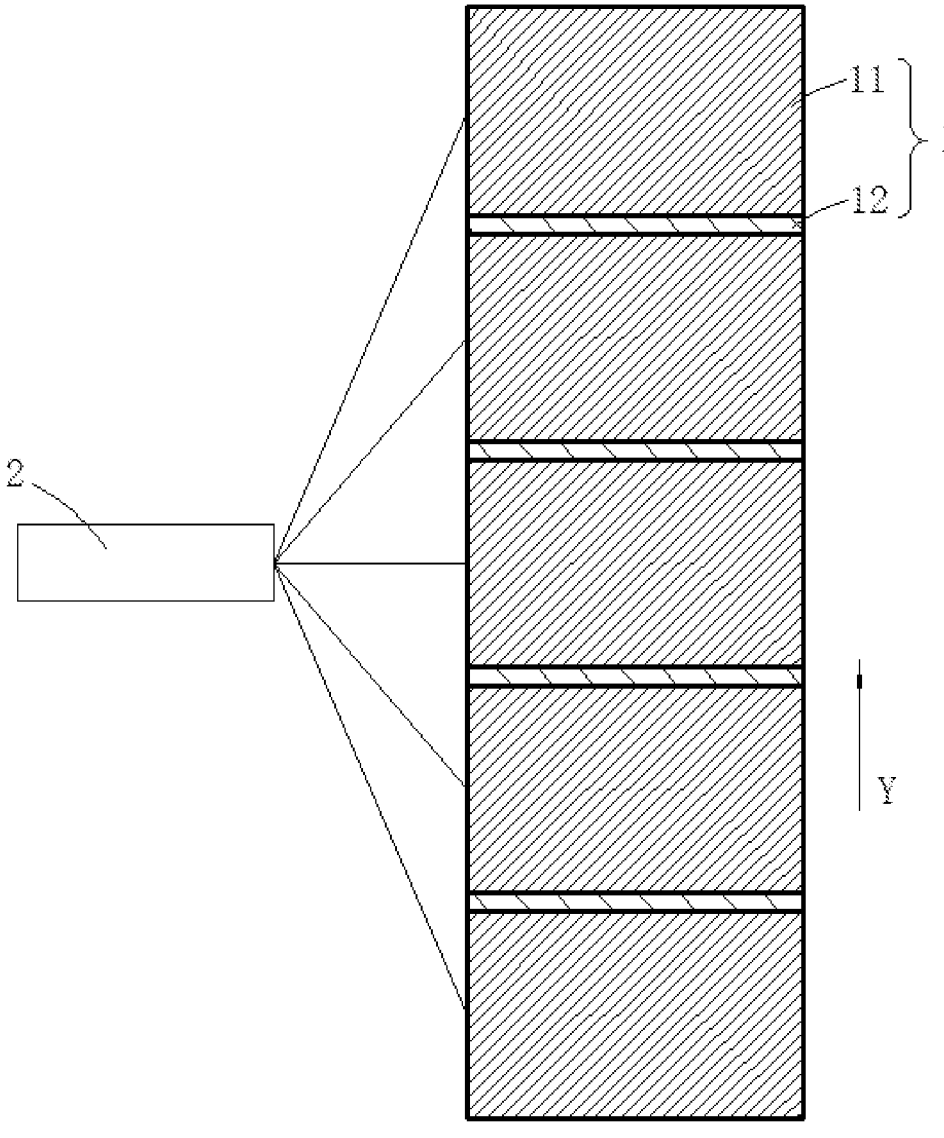
FIG. 2 is one of the structural schematic diagrams of an anode plate provided by a first embodiment of the present disclosure.
Figure 3:
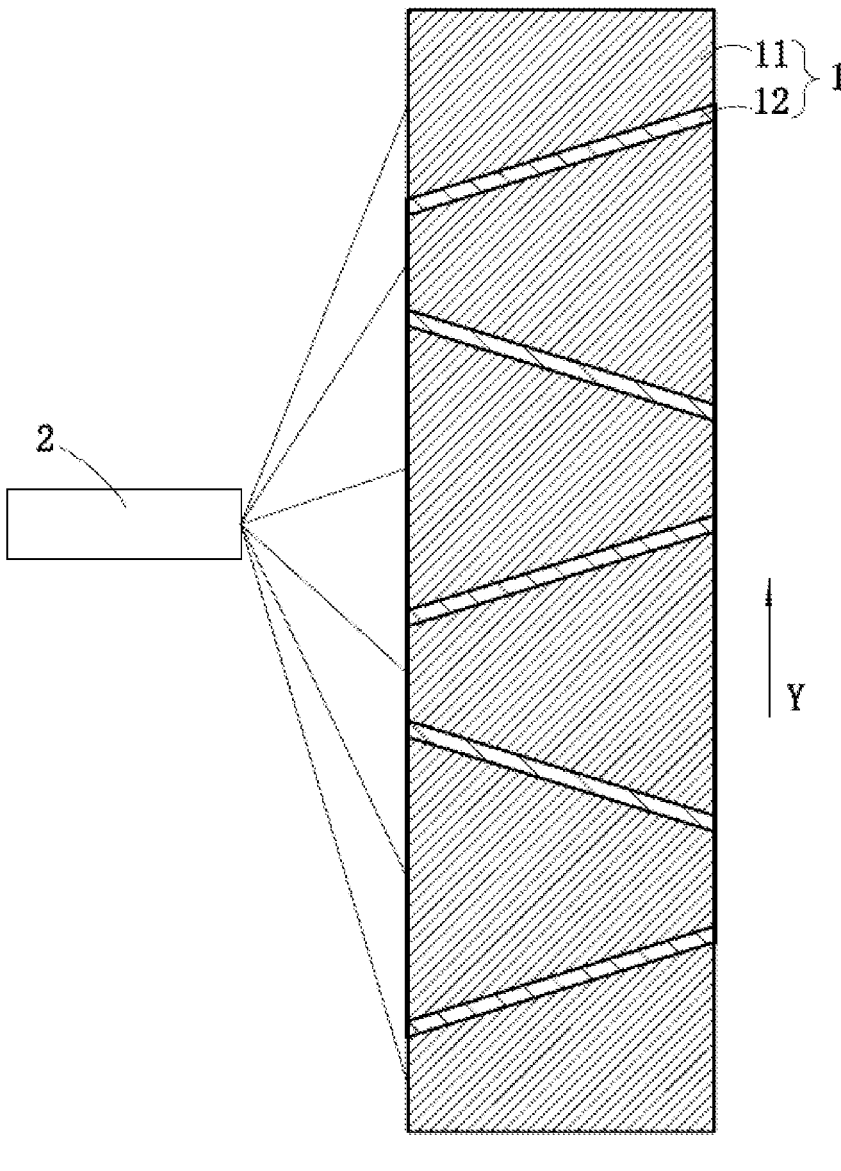
FIG. 3 is other one of the structural schematic diagrams of the anode plate provided by the first embodiment of the present disclosure.

According to an exemplary embodiment of the present disclosure, an anode plate for a film plating machine is provided. As shown in FIGS. 2 and 3, the anode plate 1 is formed by splicing a plurality of anode plate splicing units 11, and two adjacent anode plate splicing units 11 are separated by an insulating medium 12 there-between. Each anode plate splicing unit 11 is configured to be connected with the power supply 2.

In order to improve the yield of the conductive substrate film 5, the lengths of the anode plates 1 suitable for the film plating machines with different breadth specifications are different. In addition, within the allowable length range of the anode plate 1, the smaller the resistance of anode plate 1 is, the better the uniformity of current density is, and thus the better the uniformity of formed plating layer is.

Hence, according to the breadth specification of the film plating machine, the anode plate 1 can be formed by splicing a plurality of anode plate splicing units 11, so the length of the anode plate 1 can be flexibly adjusted to be suitable for the film plating machines with different breadth specifications. In addition, the two adjacent anode plate splicing units 11 are separated by the insulating medium 12, and each anode plate splicing unit 11 is configured to be connected with at least one power supply 2, so that the plurality of anode plate splicing units 11 are connected in parallel. The magnitude of the currents passing from the power supply 2 into respective anode plate splicing units 11 are similar to each other, thereby ensuring the consistency of the plating layer on the surface of the conductive substrate film 5.

It should be noted that the above-mentioned insulating medium 12 may be insulating materials such as rubber and plastic. Alternatively, a gap may be formed between two adjacent anode plate splicing units 11, and the air at the gap can form the insulating medium 12.

Figure 4:
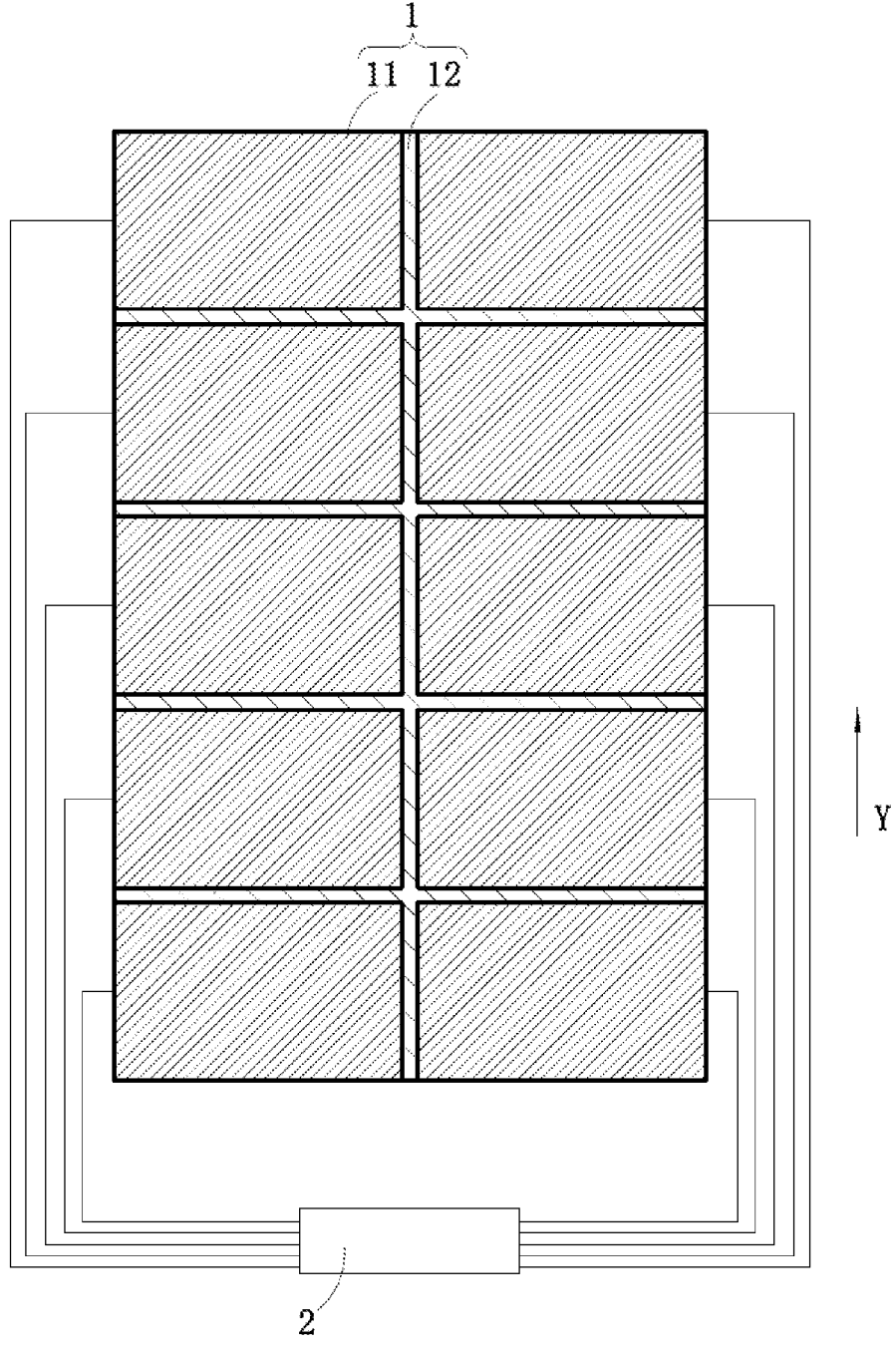
FIG. 4 is one of the structural schematic diagrams of arrangement of anode plate splicing units in the anode plate according to the first embodiment of the present disclosure.
Figure 5:
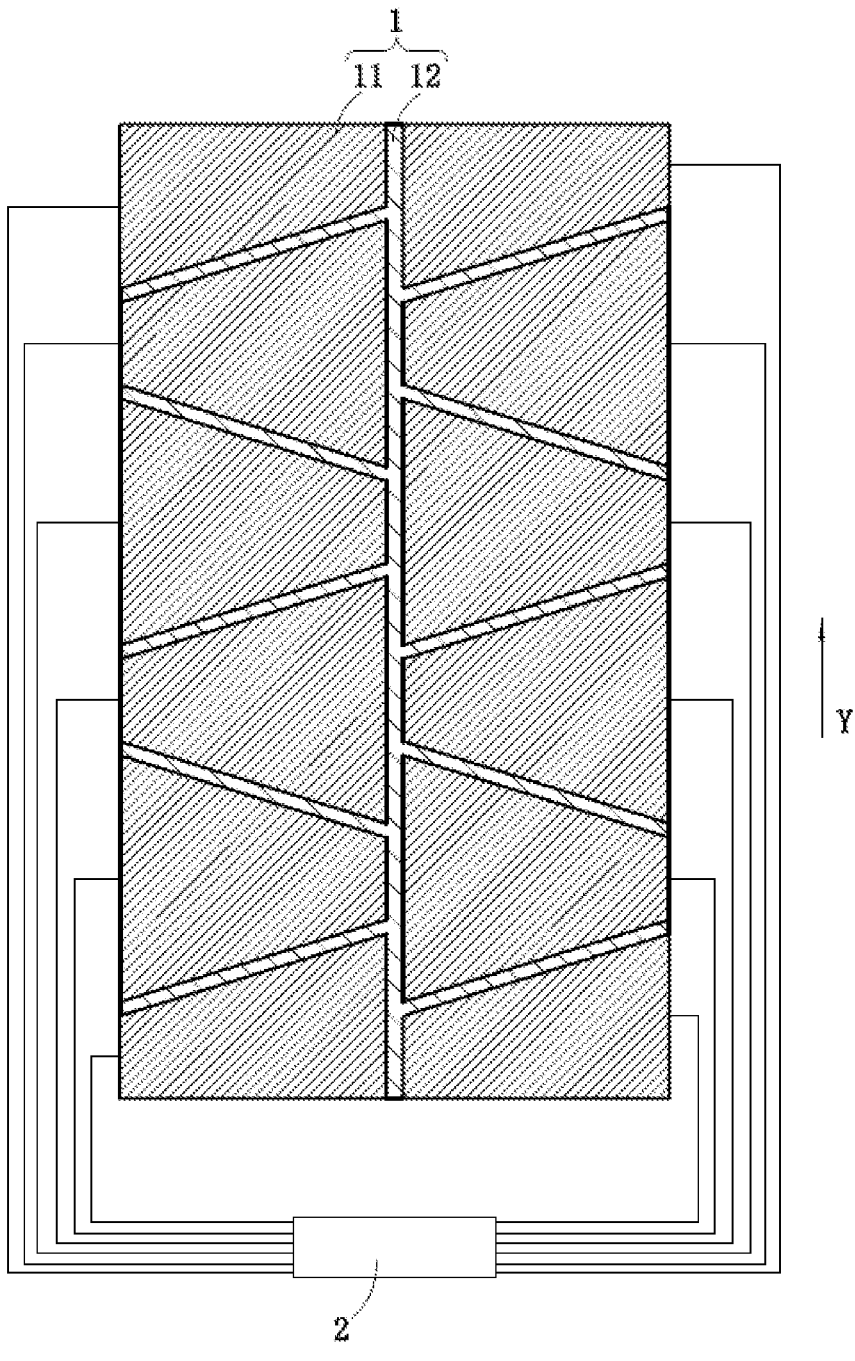
FIG. 5 is other one the structural schematic diagrams of the arrangement of the anode plate splicing units in the anode plate according to the first embodiment of the present disclosure.

The anode plate splicing units 11 are sequentially spliced and arranged along the first linear direction, i.e., along the Y direction in FIGS. 4 and 5. In actual use, the plurality of anode plate splicing units 11 may be spliced along the breadth direction of the film plating machine, so that the anode plate 1 can be formed into a rectangular plate. Therefore, when the width of the film plating machine is fixed, the anode plate splicing units 11 may be spliced in a single row or multiple rows along the breadth direction, so that the anode plate 1 not only can change in a length direction (i.e. the breadth direction), but also can change in a width direction. If the width of the anode plate 1 is large, the area of the anode plate 1 is likely to be too large, which will not only increase the weight of the anode plate 1, causing the anode plate 1 to be inconvenient to take, but will also cause the utilization rate of the anode plate 1 to be low, increasing the cost. Therefore, it is a preferable solution to splicing the anode plate splicing units 11 in a single row along the breadth direction. In addition, the rectangular plate has a shape compatible with that of the conductive substrate film 5, and has a neat appearance which is easy to manufacture.

Figure 6:
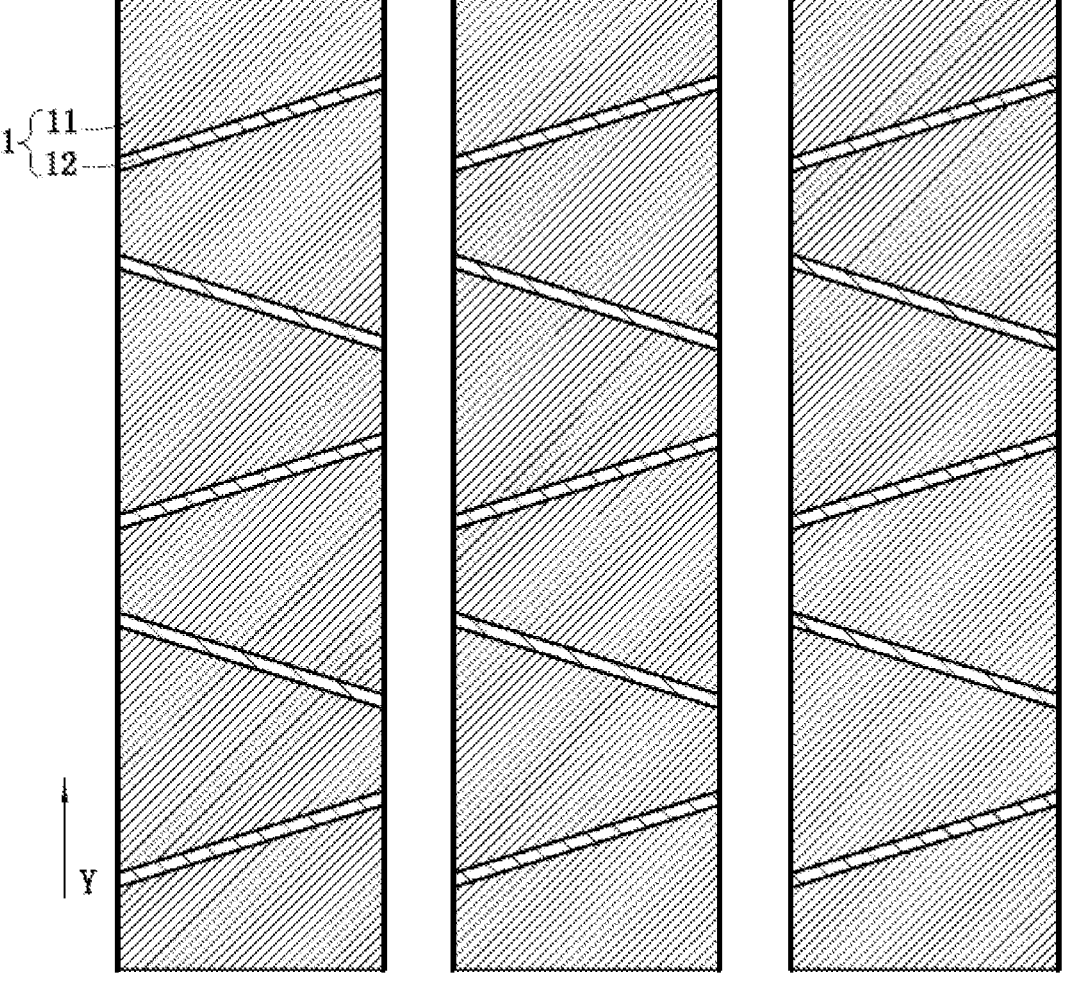
FIG. 6 is one of schematic diagrams of the arrangement of a plurality of anode plates.
Figure 7:
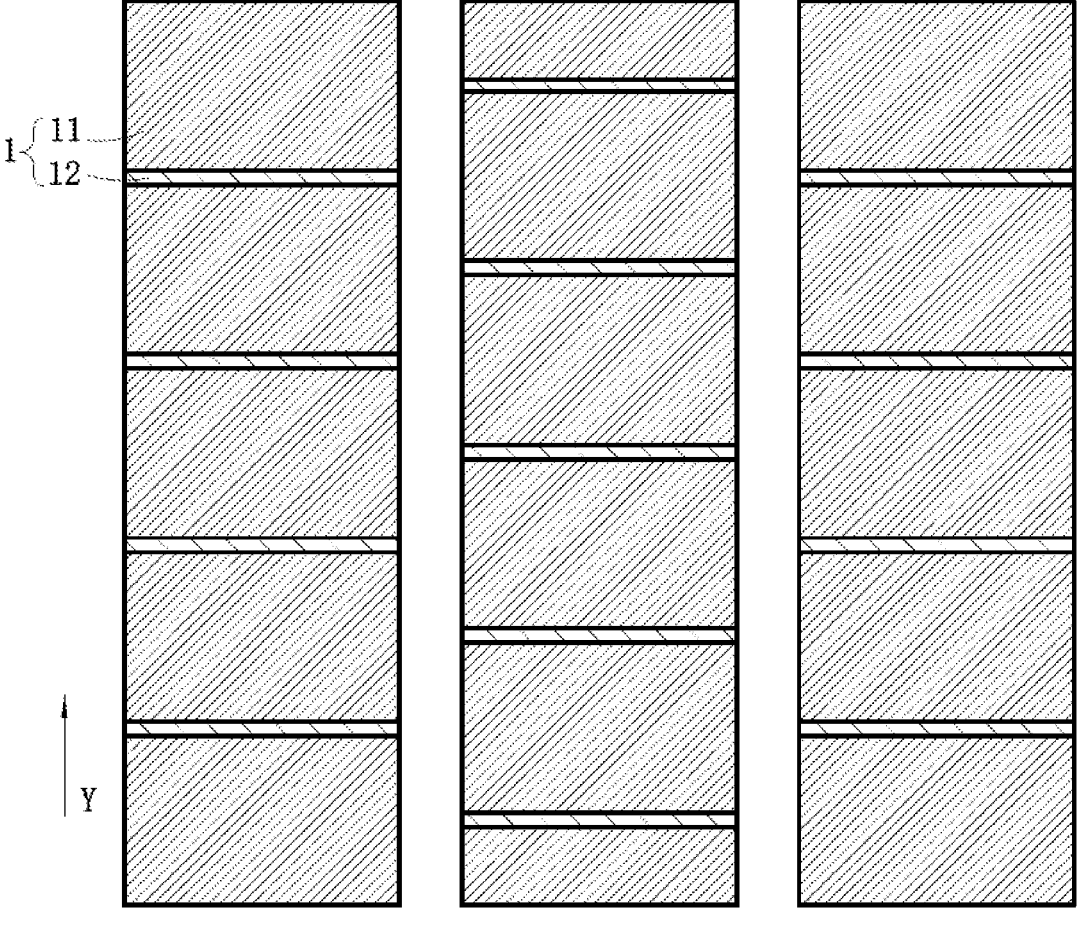
FIG. 7 is other one the schematic diagrams of the arrangement of a plurality of anode plates.

During the electroplating process, since splicing seams of the anode plate splicing units 11 are provided with the insulating medium 12 and there is no current passing through, the plating layer on the surface of the conductive substrate film 5 corresponding to the splicing seams may be thin. In order to solve the above problem, as shown in FIGS. 6 and 7, the splicing seam of two adjacent anode plate splicing units 11 may be inclined with respect to the Y direction. When the splicing seam is inclined with respect to (excluding perpendicular to) the Y direction, since the extension direction of the seams are inconsistent with the film feeding direction, during the movement of the conductive substrate film 5 along the film feeding direction, the conductive substrate film 5 will not be formed with a whole strip of thinner plating layer, which can eliminate the problem of uneven thickness of the plating layer. When the splicing seams are perpendicular to the Y direction, at least two anode plates 1 arranged along the film feeding direction can be designed to participate in the electroplating process, and the seams on two adjacent anode plates 1 are staggered to each other, so that a part with thinner plating layer of the conductive substrate film 5 formed after passing through a first anode plate 1 can correspond to a non-splicing seam part of a second anode plate 1 when passing through the second anode plate 1, so that the thinner plating layer is supplemented, thereby improving the uniformity of the plating layer on surface of the conductive substrate film 5.

It should be noted that the anode plate splicing unit 11 may be a plate with any shape, such as a triangular plate, a trapezoidal plate, a rectangular plate, an irregular pattern plate, and the like.

Figure 8:
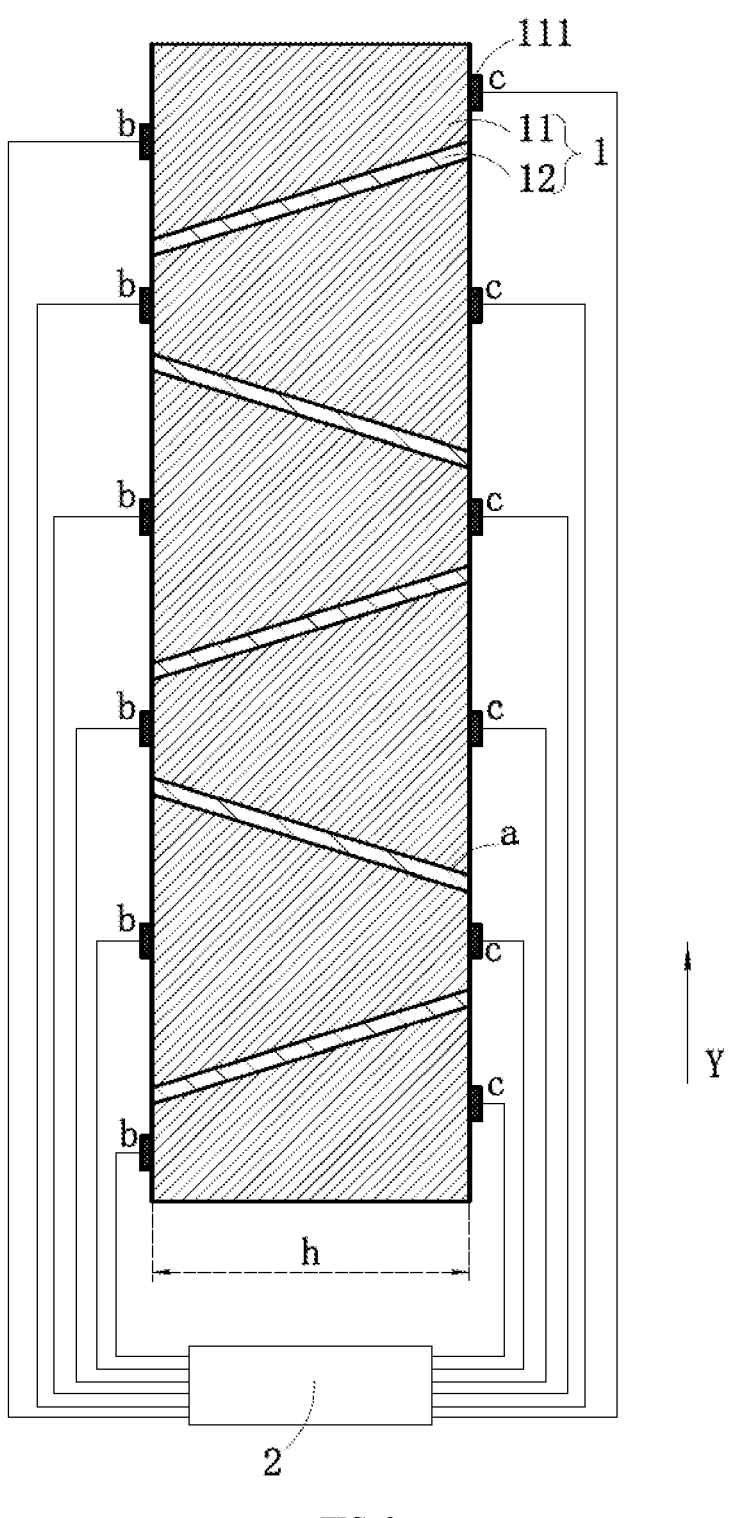
FIG. 8 is a structural schematic diagram of the anode plate provided by the first embodiment of the present disclosure, which is composed of anode plate splicing units with a trapezoidal plate structure.

FIG. 8 shows an anode plate 1 spliced by anode plate splicing units 11 with a trapezoidal plate structure, wherein the plurality of trapezoidal plates have equal heights h, and two adjacent trapezoidal plates are spliced together with one of non-parallel sides a of one trapezoidal plate adjacent to one of non-parallel sides a of the other trapezoidal plate. For example, in order to form an anode plate 1 of a rectangular plate with regular shape by means of splicing a plurality of trapezoidal plates, two right-angled trapezoidal plates can be provided as trapezoidal plates at two ends of the plurality of trapezoidal plates respectively, and each trapezoidal plate in the middle part can be set as isosceles trapezoidal plates. Furthermore, in order to improve the interchangeability of components, the dimensions of each isosceles trapezoid plate may be the same, and the dimensions of the right-angled trapezoid plates at two ends are also the same. Therefore, during an assembling process, the positions of the isosceles trapezoidal plates can be interchanged, and the positions of the right-angled trapezoidal plates at both ends can also be interchanged. As a result, the wrong assembly of components can be effectively prevented, and the assembly efficiency can be improved.

Figure 9:
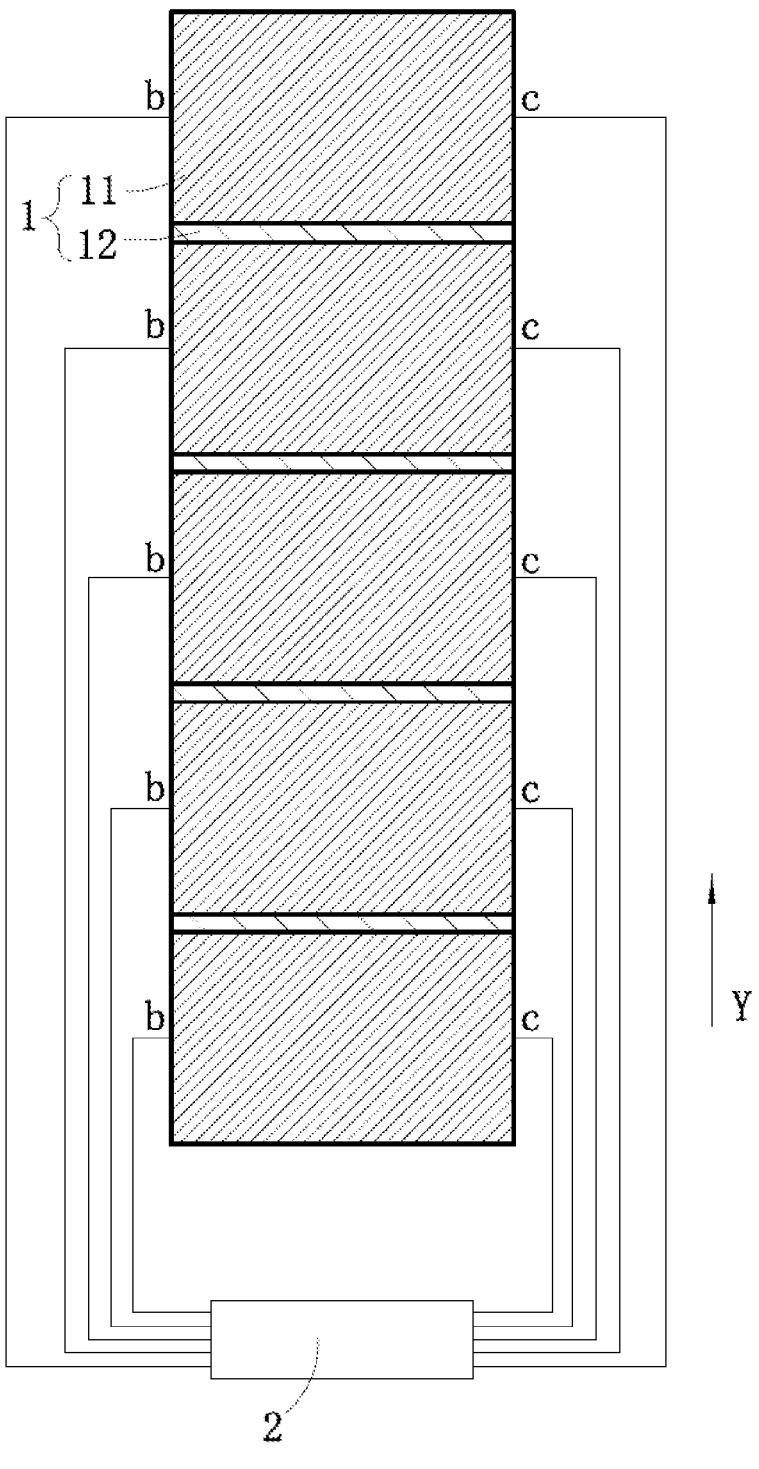
FIG. 9 is a structural schematic diagram of the anode plate provided by the first embodiment of the present disclosure, which is composed of anode plate splicing units with a rectangular plate structure.

FIG. 9 shows an anode plate 1 spliced by anode plate splicing units 11 with a rectangular plate structure, wherein the splicing seam between two adjacent rectangular plates extends along the film feeding direction. The rectangular plate structure has a regular shape, and thus is more convenient to manufacture.

During the electroplating process, when the anode plate splicing units 11 are connected to the power supply 2, in order to make the currents through the anode plate splicing units 11 basically the same, as shown in FIG. 8, middle parts (i.e. b position and c position) of the two opposite sides parallel to the Y direction of the anode plate splicing unit 11 may be configured to be connected with the power supply 2 respectively, so that the currents flowing through respective parts of the anode plate splicing units 11 are basically the same, thereby improving the uniformity of the plating layer on surface of the conductive substrate film 5.

It should be noted that the part where the anode plate splicing unit 11 is connected to the power supply 2 may be directly connected to the power supply 2 through wires, and a terminal may also be provided on the connection part of the anode plate splicing unit 11. A connecting wire may be provided on the terminal and other end of the connecting wire may be configured to be connected with the power supply 2.

As shown in FIG. 8, terminals 111 for connecting to the power supply 2 may be respectively provided on middle parts of the upper line and of the lower line of the trapezoidal plate, and two terminals 111 are respectively connected to the power supply 2. In this way, the connection areas to the power supply 2 on both sides of the anode plate splicing units 11 can be basically the same, then the voltages and resistances on both sides are basically the same, so that the currents flowing through each part of the anode plate splicing units 11 are similar in magnitude, which makes it easier to improve the uniformity of plating layer on surface of the conductive substrate film 5.

Figure 10:
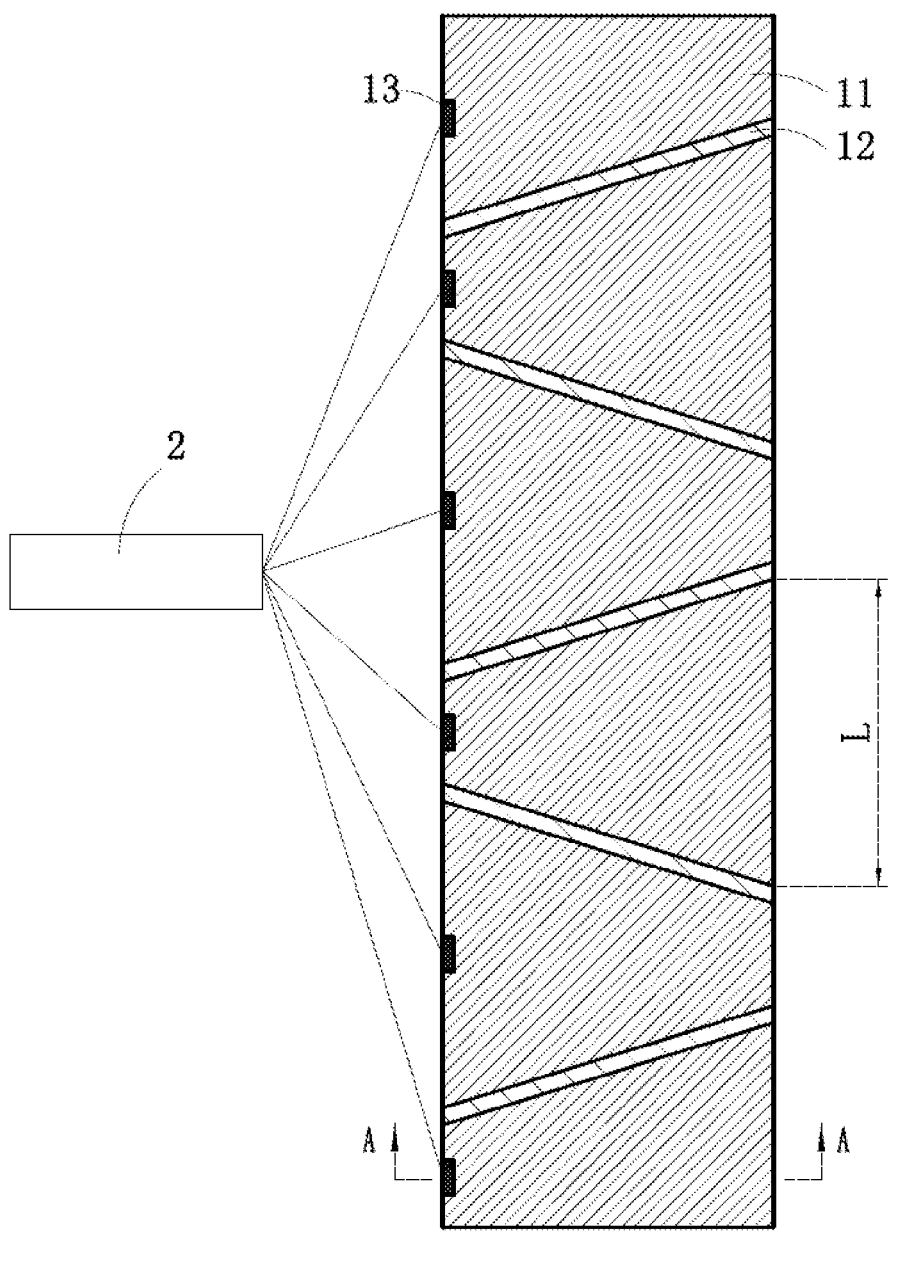
FIG. 10 is a top view of the anode plate connected with conductive metal strips provided by first embodiment of the present disclosure.
Figure 11:
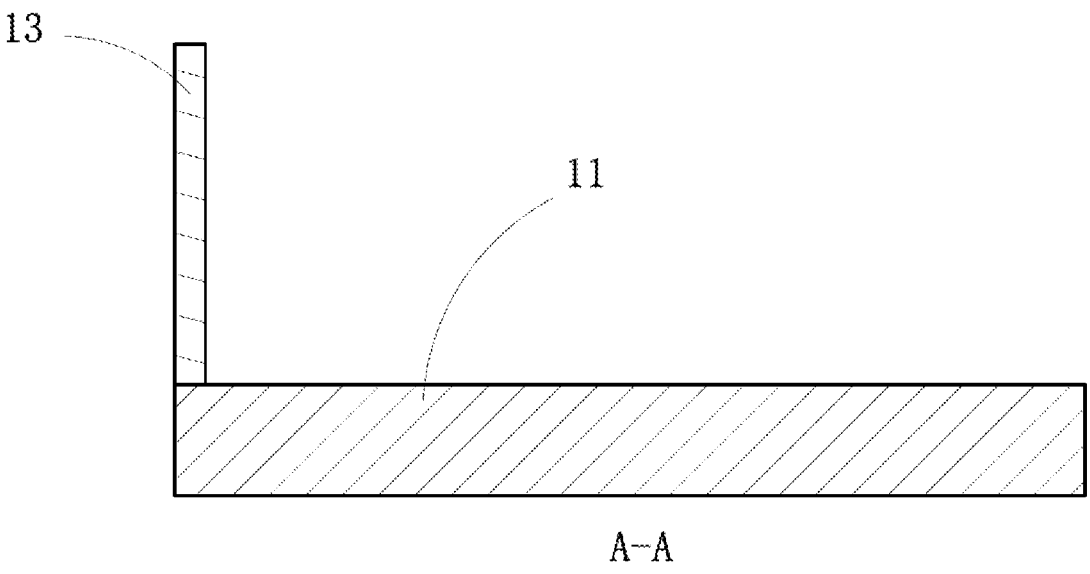
FIG. 11 is a sectional view taken from A-A in FIG. 10.

As shown in FIGS. 10 and 11, each anode plate splicing unit 11 is connected with a conductive metal strip 13, the surface of the conductive metal strip 13 is an inert titanium layer, and the interior of the conductive metal strip is a conductive material (copper, gold, etc.). The conductive metal strip 13 extends in a direction perpendicular to the anode plate 1, and the anode plate splicing unit 11 is connected to the power supply 2 through the conductive metal strip 13. The conductive metal strip 13 protrudes from the plating liquid surface, which not only facilitates the connection with the power supply 2, but also facilitates the removal of the anode plate splicing unit 11 from the plating liquid. In addition, the conductive metal strip 13 may also be connected to the terminal 111 (not shown in the figure, referring to FIG. 8 for details), and the anode plate splicing unit 11 is connected with the power supply 2 by the conductive metal strip 13 and the terminal 111.

Figure 12:
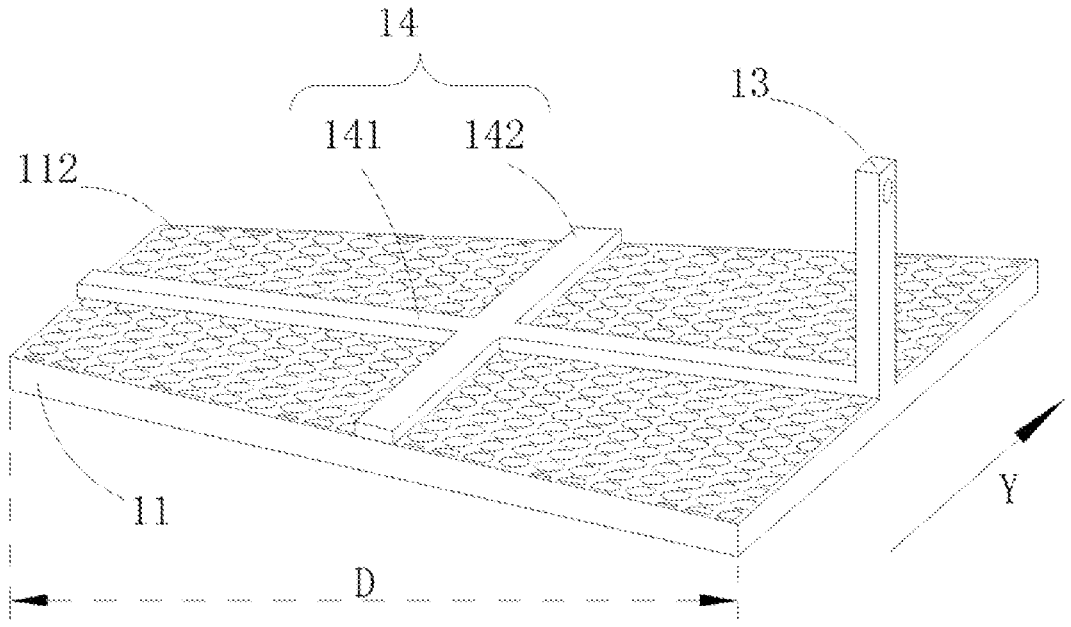
FIG. 12 is a perspective structural schematic diagram of an anode plate splicing unit in an anode plate provided by first embodiment of the present disclosure.

As shown in FIG. 12, a conductive metal frame 14 is attached to the surface of each anode plate splicing unit 11, and the conductive metal frame 14 is electrically connected to the conductive metal strip 13. The arrangement of the conductive metal frame 14 is equivalent to providing a connecting conductive wire on the surface of the anode plate splicing unit 11, thereby reducing the resistance, making the currents through respective parts of the anode plate splicing unit 11 basically the same, which improves the uniformity of the current density and thus makes it easy to fulfill the uniformity requirement of the plating layer on surface of the conductive substrate film 5.

Furthermore, the conductive metal frame 14 is a cross-shaped metal frame, and the cross-shaped metal frame includes a first metal strip 141 and a second metal strip 142 that are cross-fixed, and both the first metal strip 141 and the second metal strip 142 are attached to the surface of the anode plate splicing unit 11. The first metal strip 141 is located on the connection line between the midpoints of the upper line and of the lower line of the anode plate splicing unit 11, and the second metal strip 142 is located on the connection line between the midpoints of the non-parallel sides of anode plate splicing unit 11, which not only increases the attachment area between the conductive metal frame 14 and the anode plate splicing unit 11, but also makes the area of each part formed by dividing the anode plate splicing unit 11 with the conductive metal frame 14 basically the same, which further improves the uniformity of the current density, thereby further improving the consistency of plating layer on surface of the conductive substrate film 5. In addition, the conductive metal frame 14 may also have an "X" shape, a "#" shape, etc., which can also improve the uniformity of the current density.

It should be noted that the lengths of the first metal strip 141 and of the second metal strips 142 may be set not to exceed the surface area of the anode plate splicing unit 11, that is, the length of the first metal strip 141 is less than or equal to the width D of anode plate splicing unit 11 (i.e., the width of the anode plate 1), the length of the second metal strip 142 is less than or equal to the range of length of the anode plate splicing unit 11 (the dimension in a direction parallel to the Y direction is the length of the anode plate splicing unit 11), so that an interference between the first metal strip 141, the second metal strip 142 and the supporting frame 15 can be avoided when the anode plate splicing units 11 are spliced and arranged.

As shown in FIG. 10, a value of maximum length L of each anode plate splicing unit 11 is in a range of 300 mm to 350 mm When the length of the anode plate splicing unit 11 is less than 300 mm, the resistance of the anode plate splicing unit 11 will be smaller, but too small size will increase the manufacturing difficulty and increase the manufacturing cost. When the length of the anode plate splicing unit 11 is greater than 350 mm, the resistance of the anode plate splicing unit 11 will be large, and the currents flowing through each part of the anode plate splicing unit 11 will have a large difference there-between, and thus it is difficult to meet the consistency requirement of the plating layer on surface of the conductive substrate film 5. Therefore, the range of the length of anode plate splicing unit 11 from 300 mm to 350 mm not only can effectively reduce the resistance of the anode plate splicing unit 11, improve the uniformity of the current density, thereby improving the consistency of the plating layer on surface of the conductive substrate film 5, but also can reduce quality of the anode plate splicing unit 11, which causes the anode plate splicing unit to be easy to take and manufacture.

The anode plate splicing unit 11 may be of a complete plate-like structure, or may be of a hollow plate-like structure. As shown in FIG. 12, through holes 112 may also be provided in the anode plate splicing unit 11, and the through holes 112 may be designed as a circular hole, an oval hole or a polygonal hole, which is not limited herein. A plurality of through holes 112 may be provided and are evenly distributed in the anode plate splicing unit 11. The anode plate splicing unit 11 with such structure not only has light weight and is easy to take, but also reduces resistance and increases the contacting area between the anode plate splicing unit 11 and the plating solution, thereby improving the uniformity of the plating layer on the surface of the conductive substrate film 5.

There are various options for the connection between the anode plate splicing units 11. For example, insulating strips may be provided between the anode plate splicing units 11, and the insulating strips and the anode plate splicing units 11 may be fixedly connected by bolts to form the anode plate 1. Alternatively, the anode plate splicing units 11 may be sequentially fixed on an insulating plate by snaps, and the anode plate splicing units 11 may be spliced by means of insulating rubber ribs provided there-between to assemble the anode plate 1.

Figure 13:
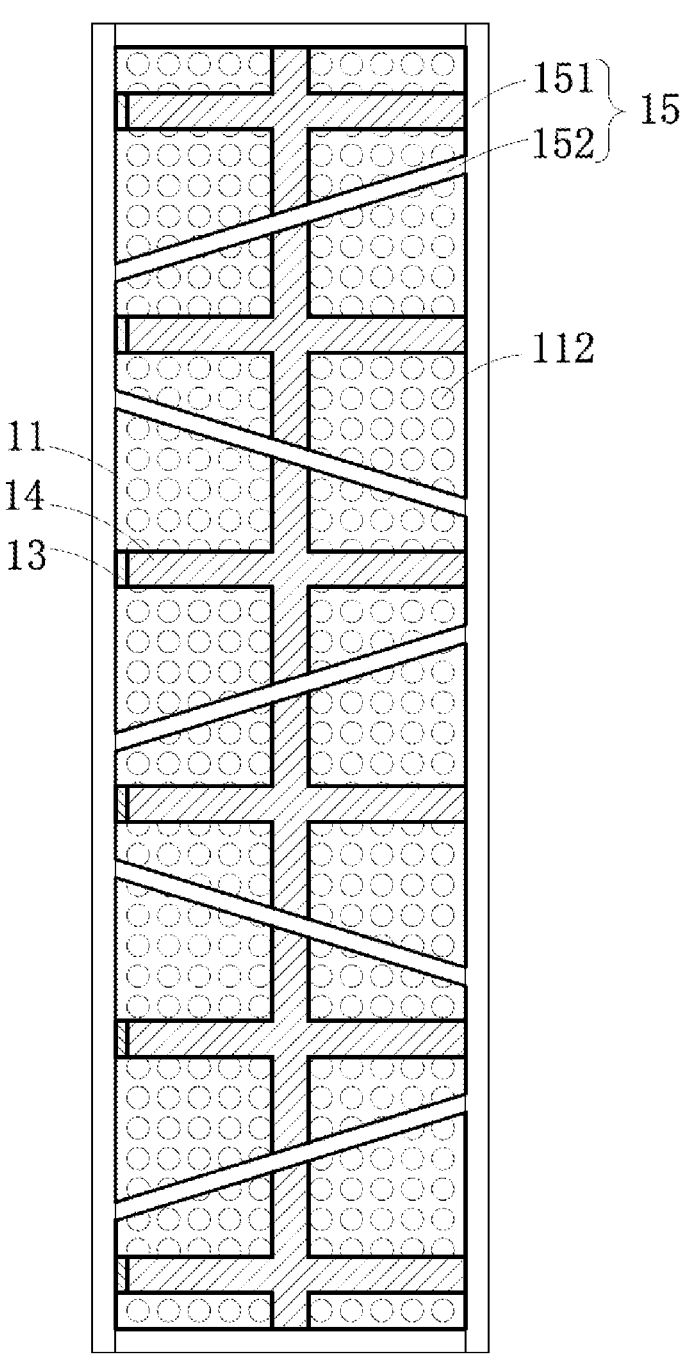
FIG. 13 is a structural schematic diagram of the anode plate with a supporting frame and a conductive metal frame provided by first embodiment of the present disclosure.

In addition, in order to make the connection between the anode plate splicing units 11 more stable, as shown in FIG. 13, the anode plate 1 further includes a supporting frame 15, and the supporting frame 15 includes a border 151 and a plurality of separating ribs 152 arranged within the border 151. Both of the border 151 and the separating ribs 152 are made of insulating materials, and the plurality of separating ribs 152 divide the space enclosed by the border 151 into a plurality of subspaces. In each subspace, an anode plate splicing unit 11 which has a shape matching the shape of the subspace is fixed therein. The supporting frame 15 firmly fixes the plurality of anode plate splicing units 11, prevents the anode plate splicing units 11 from being separated and scattered from others, and thus improves the reliability of the film plating machine. It should be noted that the supporting frame 15 is suitable for any anode plate splicing unit 11 with the above-mentioned trapezoidal plate and rectangular plate.

Figure 14:
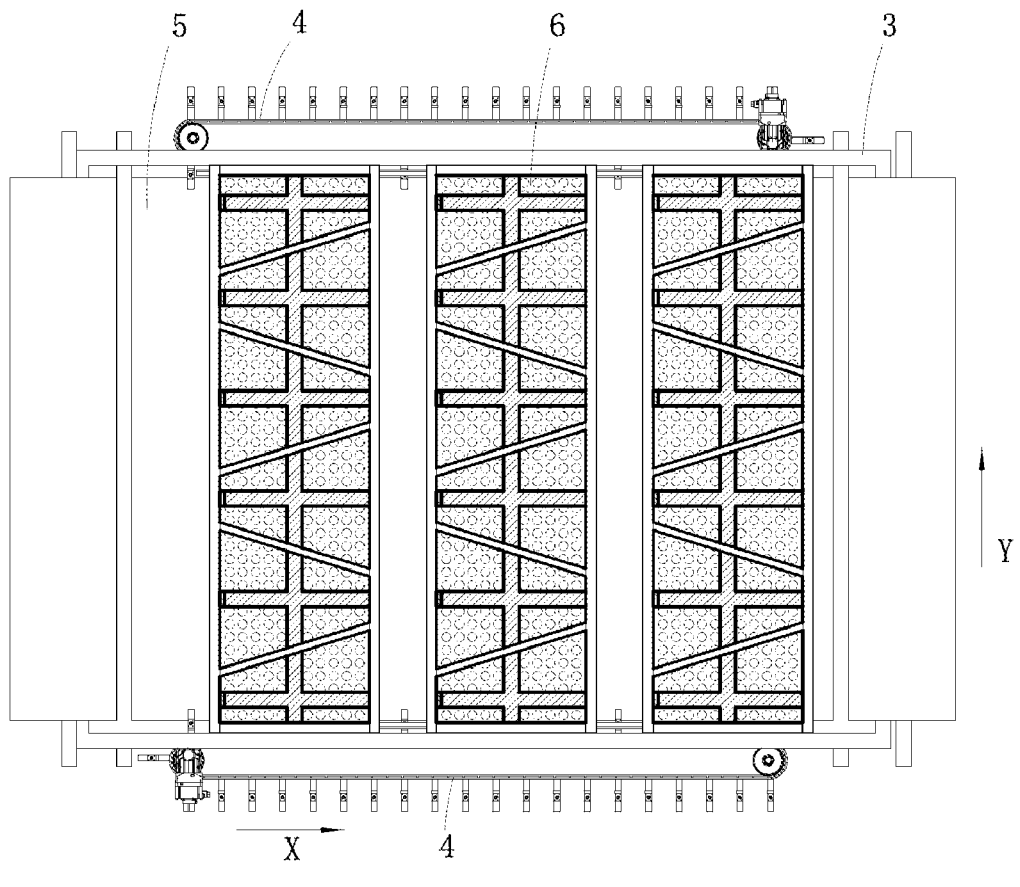
FIG. 14 is a top view of a film plating machine provided by a second embodiment of the present disclosure.

According to another exemplary embodiment of the present disclosure, a film plating machine, as shown in FIG. 14, is provided. The film plating machine includes at least one power supply 2 (not shown in the figure), a plating solution tank 3 and a conductive substrate film conveying device 4 disposed on both sides of the plating solution tank 3. The conductive substrate film conveying device 4 is configured to drive the horizontally arranged conductive substrate film 5 to move along the film feeding direction (i.e., the X direction). The plating solution tank 3 is sequentially provided therein with a plurality of anode plate groups 6 at intervals along the X direction. An anode plate group 6 includes an upper anode plate and a lower anode plate located on the upper and lower sides of the conductive substrate film 5, respectively. It should be noted that the upper anode plate and the lower anode plate use the anode plate 1 provided by the previous embodiment with respect to the anode plate, and each anode plate splicing unit 11 in the anode plate 1 is connected to the power supply 2.

The conductive substrate film conveying device 4 is configured to drive the horizontally arranged conductive substrate film 5 to move along the X direction, so as to bring the conductive substrate film 5 enter and leave the plating solution tank 3. Within the plating solution tank 3, the plurality of upper anode plates and lower anode plates are provided at intervals on upper and lower sides of the conductive substrate film 5 respectively. The upper anode plate is configured for plating the upper surface of the conductive substrate film 5, the lower anode plate is configured for plating the lower surface of the conductive substrate film 5, and both the upper anode plate and the lower anode plate adopt the spliced anode plate 1, so that the plating layers on both the upper and lower surfaces of the conductive substrate film 5 can be uniform.

Furthermore, a plurality of power supplies 2 may be provided, and the plurality of anode plate splicing units 11 are connected to a plurality of power supplies 2 in one-toone correspondence. Therefore, not only the currents applied on each anode plate splicing unit 11 can be ensured to be similar in magnitude, but also the currents applied on the corresponding anode plate splicing units 11 can be adjusted respectively according to the uniformity of the plating layer on the surface of the conductive substrate film 5, so as to further ensure the consistency of the plating layer on the surface of the conductive substrate film 5.

As shown in FIG. 14, the upper anode plate and the lower anode plate are both rectangular plates, and the upper anode plate and the lower anode plate are respectively formed by splicing the plurality of anode plate splicing units 11 along the length direction of the rectangular plate. The width direction of the rectangular plate is parallel to the X direction, the splicing seams between the adjacent two anode plate splicing units 11 extend along the X direction, and the splicing seams in the upper anode plates in adjacent two anode plate groups 6 are staggered in the X direction, and the splicing seams in the lower anode plates in adjacent two anode plate groups 6 are staggered in the X direction.

Because both the upper anode plate and the lower anode plate use the anode plate 1 provided by the previous embodiment with respect to the anode plate, and the splicing seams of the upper anode plate and the lower anode plate in the adjacent two anode plate groups 6 are staggered, it can effectively avoid the situation that part of the plating layer on the surface of the conductive substrate film 5 is thin due to the splicing seams, which ensures that the plating layers on the upper surface and lower surface of the conductive substrate film 5 are uniform, so that the conductive substrate film 5 meets the requirement of consistency.

Finally, it should be noted that the above embodiments are only used to illustrate the technical solutions of the present disclosure, but not intend to limit them. Although the present disclosure has been described in detail with reference to the foregoing embodiments, those skilled in the art should understand that: the technical solutions disclosed in the foregoing embodiments can still be modified, or some or all of the technical features thereof may be replaced by equivalent. These modifications or replacements do not make the essence of the corresponding technical solutions deviate from the scope of technical solutions of various embodiments of the present disclosure.

What is claimed is:

1. An anode plate for a film plating machine, wherein the anode plate is formed by splicing a plurality of anode plate splicing units, any two adjacent anode plate splicing units of the plurality of anode plate splicing units are separated by an insulating medium, and each of the plurality of anode plate splicing units is configured to be connected with a power supply, wherein each of the plurality of anode plate splicing units is connected with one conductive metal strip, the conductive metal strip extends along a direction perpendicular to the anode plate, and the conductive metal strip is configured to be connected with the power supply;

a conductive metal frame is attached to the surface of each of the plurality of anode plate splicing units, and the conductive metal frame is electrically connected to the conductive metal strip;

the conductive metal frame is a cross-shaped metal frame, the cross-shaped metal frame comprises a first metal strip and a second metal strip which are cross-fixed, and both the first metal strip and the second metal strip are attached to the surface of each of the plurality of anode plate splicing units, wherein the first metal strip is located on a connection line between a midpoint of an upper line and a midpoint of a lower line of each of the plurality of anode plate splicing units, and the second metal strip is located on a connection line between midpoints of non-parallel sides of each of the plurality of anode plate splicing units, wherein the plurality of anode plate splicing units are a plurality of trapezoidal plates, a middle part of the upper line and a middle part of the lower line of each of the plurality of trapezoidal plates are configured to be connected with the power supply, respectively.

2. The anode plate for a film plating machine according to claim 1, wherein the plurality of the anode plate splicing units are sequentially spliced along a first linear direction.

3. The anode plate for a film plating machine according to claim 2, wherein the anode plate is a rectangular plate, and the first linear direction is a length direction of the rectangular plate.

4. The anode plate for a film plating machine according to claim 2, wherein a splicing seam between any two adjacent anode plate splicing units of the plurality of anode plate splicing units is inclined with respect to the first linear direction.

5. The anode plate for a film plating machine according to claim 3, wherein the plurality of the trapezoidal plates have equal heights, and any two adjacent trapezoidal plates of the plurality of trapezoidal plates are spliced together with one of non-parallel sides of one trapezoidal plate adjacent to one of non-parallel sides of the other trapezoidal plate.

6. The anode plate for a film plating machine according to claim 2, wherein a maximum length value of each of the plurality of anode plate splicing units in the first linear direction is in a range of 300 mm to 350 mm.

7. The anode plate for a film plating machine according to claim 1, wherein each of the plurality of anode plate splicing units is provided with a through hole.

8. The anode plate for a film plating machine according to claim 1, further comprising a supporting frame, wherein the supporting frame comprises a border and a plurality of separating ribs arranged within the border, the border and the separating ribs are both made of insulating materials, and wherein a space enclosed by the border is divided into a plurality of subspaces by the plurality of the separating ribs, and in each subspace, an anode plate splicing unit which has a shape matching the shape of the subspace is fixed therein.

9. A film plating machine comprising:

a power supply, a plating solution tank, and a conductive substrate film conveying device arranged on both sides of the plating solution tank, wherein:

the conductive substrate film conveying device is configured to drive the horizontally arranged conductive substrate film to move along a film feeding direction, and the plating solution tank is sequentially provided therein with a plurality of anode plate groups at intervals along the film feeding direction, each of the plurality of anode plate groups comprises an upper anode plate and a lower anode plate located on upper and lower sides of the conductive substrate film respectively, each of the upper anode plate and the lower anode plate is an anode plate according to claim 1, and each anode plate splicing unit in each of the upper anode plate and the lower anode plate is connected to the power supply.

10. The film plating machine according to claim 9, wherein the power supply of the film plating machine comprises a plurality of power supplies, and the plurality of anode plate splicing units are connected to the plurality of power supplies in one-to-one correspondence.

11. The film plating machine according to claim 9, wherein:

the upper anode plate and the lower anode plate are both rectangular plates, and the upper anode plate and the lower anode plate are respectively formed by splicing the plurality of anode plate splicing units along a length direction of the rectangular plate, a width direction of the rectangular plate is parallel to the film feeding direction, a splicing seam between any two adjacent anode plate splicing units of the plurality of anode plate splicing units extends along the film feeding direction, and the splicing seams in the upper anode plates in any two adjacent anode plate groups of the plurality of anode plate groups are staggered in the film feeding direction, and the splicing seams in the lower anode plates in any two adjacent anode plate groups of the plurality of anode plate groups are staggered in the film feeding direction.

* * * * *